United States Patent

[11] 3,574,471

| [72] | Inventor | Elliott H. Kahn |
| | | Brooklyn, N.Y. |
| [21] | Appl. No. | 711,664 |
| [22] | Filed | Mar. 8, 1968 |
| [45] | Patented | Apr. 13, 1971 |
| [73] | Assignee | Kollsman Instrument Corporation |
| | | Syosset, N.Y. |

[54] PHOTOGRAPHIC MONITOR TO DETERMINE EXPOSURE TO LASER RADIATION
9 Claims, 11 Drawing Figs.

[52] U.S. Cl. .................................................. 356/215,
250/83, 350/298, 351/50, 351/158
[51] Int. Cl. ...................................................... G01j 1/46
[50] Field of Search........................................... 356/215;
351/50, 158; 350/298; 250/83 (PH)

[56] References Cited
UNITED STATES PATENTS

| 1,318,812 | 10/1919 | Smith .............................. | 350/298X |
| 2,358,348 | 9/1944 | Pierson et al. ................. | 351/50X |
| 3,033,988 | 5/1962 | Edgerton........................ | 356/215X |
| 3,058,392 | 10/1962 | Primeau ......................... | 350/298X |
| 3,103,150 | 9/1963 | Lange............................. | 95/44(MISC)X |
| 3,283,153 | 11/1966 | Geiger............................ | 250/83(PH) |
| 3,344,703 | 11/1967 | Milton............................ | 356/215X |
| 3,421,806 | 1/1969 | Weber............................ | 350/169X |
| 3,436,152 | 4/1969 | Compton et al. ............... | 356/104 |
| 3,463,575 | 8/1969 | Gates, Jr......................... | 356/213X |

*Primary Examiner*—Ronald L. Wibert
*Assistant Examiner*—Warren A. Sklar
*Attorney*—Giles, Cagney, Lucyshyn, Kinney ABSTRACT: A device for determining the quantity of laser radiation exposed to the eyes or body of an observer in a given period of time. A beam splitter mounted on a spectacle frame directs a small portion of incident laser light to a photosensing device such as a plate of photosensitive film also carried on the frame. A light filter, which has a band pass which passes laser frequencies and blocks the remaining band of the spectrum is supported between the film and the beam splitter. The incident laser radiation is now monitored by the film. When the film is developed, one can determine the total quantity of laser light passing into the eyes or other body portions from the exposure of the film.

PATENTED APR 13 1971

INVENTOR.
ELLIOTT H. KAHN

BY
OSTROLENK, FABER, GERB & SOFFEN

ATTORNEYS

PATENTED APR 13 1971
3,574,471
SHEET 2 OF 2
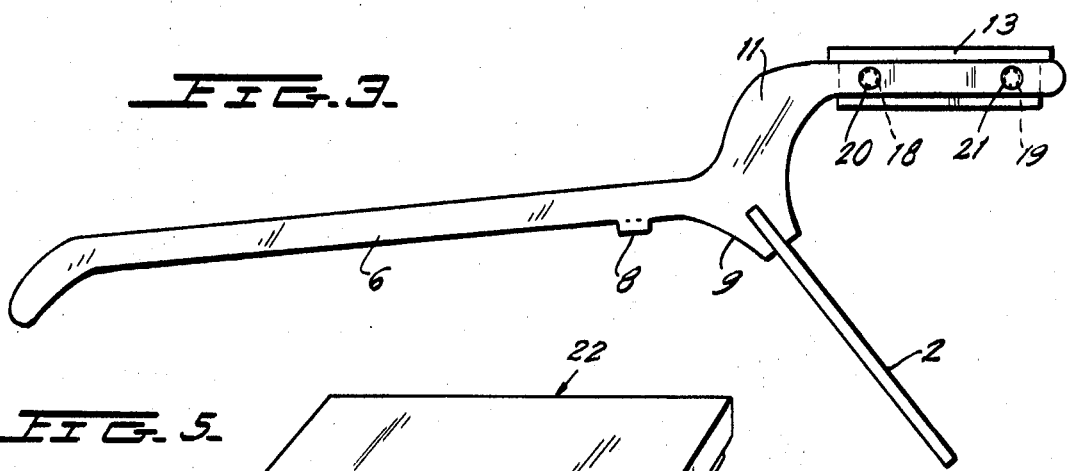
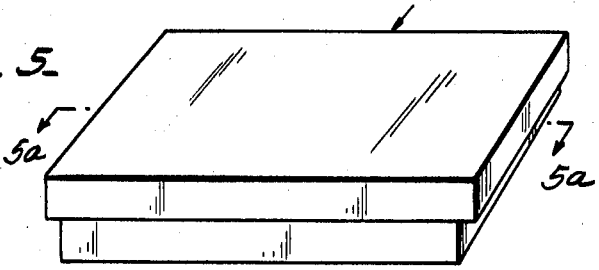
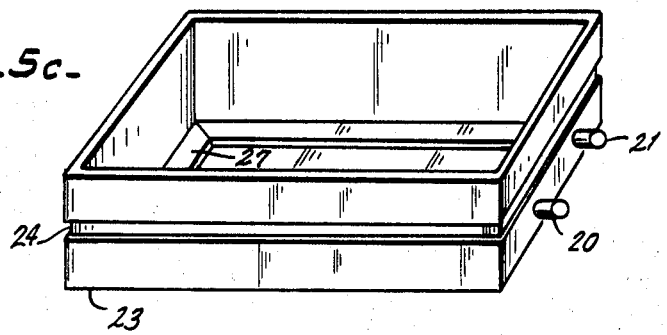
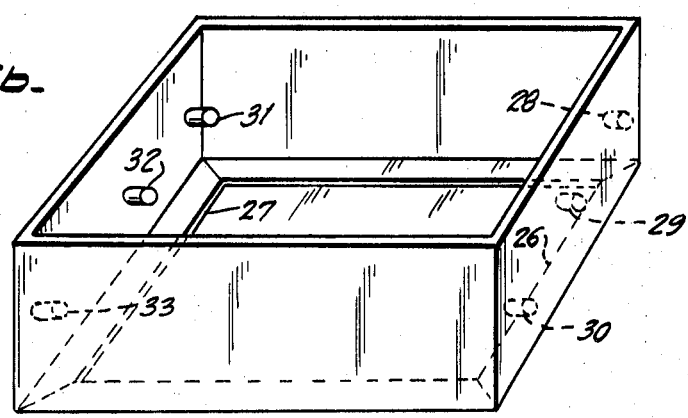
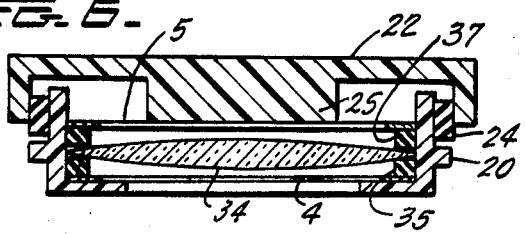
INVENTOR.
ELLIOTT H. KAHN
BY
OSTROLENK, FABER, GERB & SOFFEN
ATTORNEYS

PHOTOGRAPHIC MONITOR TO DETERMINE EXPOSURE TO LASER RADIATION

This invention relates to a device which monitors laser radiation incident upon an observer, especially the observer's eyes, and more specifically to a monitoring device which can be placed before the wearer's eye in a spectaclelike fashion.

It is desirable to have personnel working with laser radiation take initial retinal photographs with subsequent retinal examinations and photographs made at yearly intervals. It would be impractical to take more frequent examinations, for they are costly, inconvenient and time consuming. However, substantial damage to the retina can occur before the period between examinations elapses.

In addition, visitors and other observers who do not normally work with laser radiation may have occasion to view laser devices in operation. Again, it would be impractical to take retinal photographs before and after they are exposed to laser radiation.

Accordingly, a primary object of this invention is to provide a simple device which determines the amount of laser radiation to which one is exposed.

Another object of this invention is to make possible quick and inexpensive observance and evaluation of the amount of radiation to which one is exposed.

These and other objects of my invention will become apparent from the following description taken in connection with the accompanying drawings, in which:

FIG. 3 is a side elevation view of the embodiment of the invention shown in FIG. 2.

FIG. 5 is a perspective view of a portion of the embodiment of the invention shown in FIGS. 2 to 4; that portion being the casing in which the film and filter are located.

FIG. 5a is a cross-sectional view of FIG. 5 cut across the section line 5a–5a.

FIG. 5b is a phantom drawing of the interior of the bottom section of the casing as shown in FIG. 5.

FIG. 5c is a perspective view of the bottom section of the casing as shown in FIG. 5.

FIG. 6 is a cross-sectional view corresponding to FIG. 5 of an alternative embodiment of the invention.

FIG. 7b is a side elevation view of the connection shown in FIG. 7a.

Figure 1:
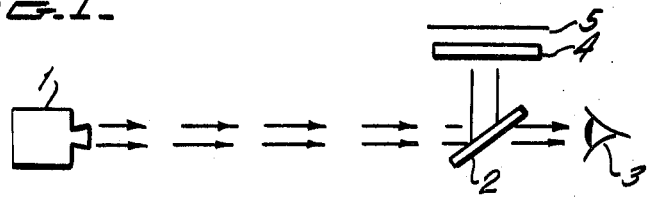
FIG. 1 is a schematic drawing of the basic components of apparatus employing the invention.

First referring to FIG. 1, which schematically describes the apparatus of the invention, laser radiation is emitted (or reflected) from a source 1, and passes through beam splitter 2 to an observer's eye 3. The radiation incident on any body portion could also be monitored, with the preferred embodiment of the invention showing monitoring of radiation applied to the eyes. Beam splitter 2 may be a 1 percent beam splitter, reflecting only 1 percent of incident light and passing 99 percent of all radiation incident upon it, thus permitting clear observation through beam splitter 2. The small reflected portion of incident laser radiation is reflected upward toward light filter 4, which passes only the portion of the spectrum including the particular laser radiation frequency and blocks portions of the spectrum of the incident light. The radiation passed by filter 4 is incident upon film 5, which can be a standard photographic film. However, film 5 could also be of a type which is particularly sensitive to the portion of the spectrum passed by filter 4. Therefore, film 5 monitors a sample of laser radiation which passes into the observer's eye 3. Beam splitter 2 is positioned at a 45° angle to the plane of film 5 and selective light filter 4 to insure that the reflected radiation sample will travel at a 90° angle in reference to its former direction.

If desired, any photosensing structure, including those which would drive indicating meters which can be continually observed, could replace the film-photosensing means, and could include photogenerating or photoconductive cells, or the like. In addition, the film could be replaced by any of the well-known dyes which change color under intense radiation, thereby eliminating the need for film development. Where the body portion being monitored is other than the eyes, such as exposed skin portions, it will be apparent that the beam splitter 2 can be disposed of.

Figure 2:
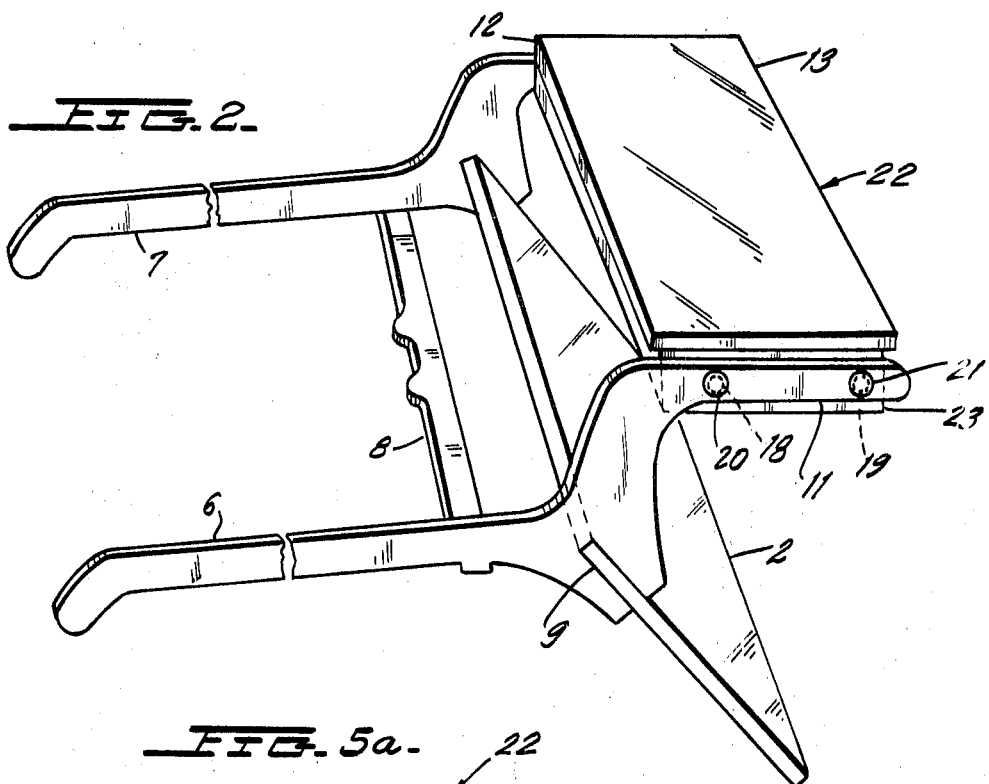
FIG. 2 is a perspective view of a preferred embodiment of the apparatus of the invention.
Figure 5A:
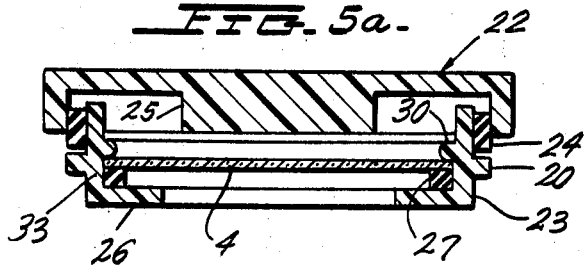

FIGS. 2 and 3 show an embodiment of the invention carried on a spectacle-type support. The spectacle frame consists of conventional earpieces 6 and 7, and a nosepiece 8. Beam splitter supports 9 and 10, and casing supports 11 and 12 then branch out as separate integral extensions from the front of the earpieces.

Figure 4:
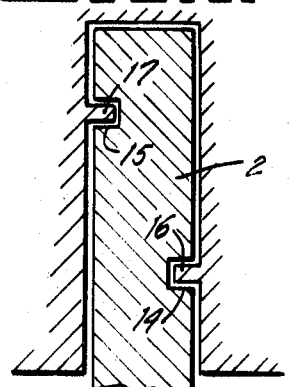
FIG. 4 is a cross section of the connection between the beam splitter and its support as shown in FIGS. 2 and 3.
Figure 7A:
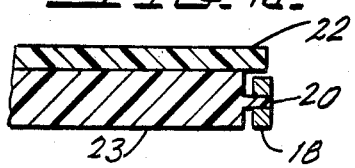
FIG. 7a is a perspective view of a portion of the embodiment of the invention shown in FIGS. 2 to 6; that portion being the connection between the casing and frame of the apparatus.
Figure 7B:
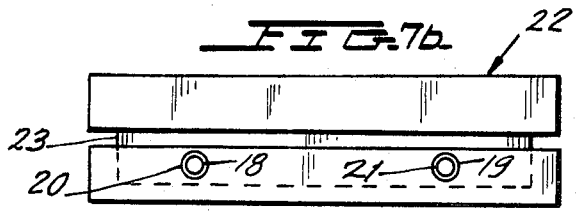

Casing supports 11 and 12 and beam splitter supports 9 and 10 are formed by upward and downward branches extending from the front of earpieces 6 and 7, respectively, (see FIG. 3). Each of casing supports 9 and 10 has slots for receiving the top edges of beam splitter 2, which may have a thickness of one-eighth inch. Beam splitter 2 is latched into the slots in supports 9 and 10 with the aid of small indentations 14 and 15 in beam splitter 2 which receive projections 16 and 17 which extend from the opposing surfaces of the slots in supports 9 and 10. (See FIG. 4.)

FIGS. 2 and 3 show that the spectacle frame curves upwards to form casing supports 11 and 12. Casing supports 11 and 12 consist of narrow, elongated projections above and parallel to the plane of earpieces 6 and 7, and are at an angle approximately 45° in relation to the plane of beam splitter 2. Two holes or indentations 18 and 19 are placed in supports 11 and 12 to receive two tabs or projections 20 and 21 fixed to the side of housing 13. Thus, there is a snap arrangement connecting housing 13 to casing supports 11 and 12.

As shown in FIGS. 2 and 3, nosepiece 8 is secured to the front portions of earpieces 6 and 7 to support the earpieces. Nosepiece 8 has a suitable centrally located nose-engaging portion which rests on the bridge of the wearer's nose.

FIGS. 5, 5a, 5b and 5c show the manner in which casing 13 houses both filter 4 and film strip 5. Casing 13 contains two sections; an upper section 22 which serves as a lid, and a lower section 23, which houses filter 4 and film strip 5.

Upper section 22 overlaps the top edges of bottom section 23 (FIG. 5a), and a gasket of rubberlike material 24 extends around the upper perimeter of the lower section 23 (FIG. 5c) to form a lightproof seal at the connection between lid 22 and bottom section 23.

In this way, no light is permitted to enter the housing except for light passed by filter 4, which is in front of film 5.

Notches 28—33 protrude from the interior walls of bottom section 23 (FIG. 5b) to hold filter 4 in place with a snap fit. Lid 22 has a large projection 25 (see FIG. 5a) extending downward for reasons which will become evident shortly. Bottom section 23 has a bottom flange 26 extending around aperture 26a in the bottom of bottom section 23. Rubber gasket 27 extends around flange 26 to provide a lightproof seal to the periphery of filter 4 which is laid upon flange 26 to form the bottom of casing 13.

The apparatus employed in the aforementioned embodiment could be applied with other mounting devices. Instead of a spectacle-type arrangement, the apparatus could be mounted on a safety helmet, or a simple elastic band encircling the wearer's head.

In operation, all light coming into the wearer's eyes 3 will necessarily pass through beam splitter 2. A portion of this light is reflected upward, through filter 4 to expose film 5. Film 5 is then removed after a given period of use, such as 1 week, and is developed, or film 5 can be developed after each use. The exposure of film 5 will then indicate the total laser radiation passing into an observer's eye 3 (although not necessarily passing into the retina). If an inordinate amount of radiation is sensed by the film, retinal photographs and examination may then be made.

As pointed out above, the photographic film could be replaced by any other type of photosensitive structure to cause immediate indication of light intensity incident thereupon.

FIG. 6 shows the use of a lens 34 in the casing 13 where the lens is held between gaskets 35 and 37 as illustrated. Note that gasket 37 replaces the notches 30 of FIG. 5a.

Although this invention has been described with respect to its preferred embodiments, it will be understood that many variations and modifications will be obvious to those skilled in the art, and it is preferred, therefore, that the scope of the invention be limited not by the specific disclosure herein, but only by the appended claims.

I claim:

1. In combination: a beam splitter; light-monitoring means having a photosensitive surface; housing means for supporting said light-monitoring means; an aperture in said housing means for exposing at least a portion of said photosensitive surface of said light-monitoring means; a main support means for securement in predetermined relation to a body portion of a wearer; means connecting said beam splitter and said housing to said main support means to locate said beam splitter fixed in a position along a line of incidence of radiation directed towards said body portion of a wearer when said main support means is secured in said predetermined relation to the body portion of said wearer; said housing aperture positioned to receive radiation redirected along an optical path from said beam splitter; said housing removed from said line of incidence.

2. The combination as set forth in claim 1 wherein said beam splitter is at a 45° angle in relation to the plane of said photosensitive surface and to said line of incidence.

3. The combination as set forth in claim 1 further comprising a selective light filter positioned between said beam splitter and said photosensitive surface.

4. The combination as set forth in claim 3 further comprising a convex lens disposed along an optical path between the beam splitter and the photosensitive surface.

5. The combination as set forth in claim 1 wherein said light-monitoring means comprises a thin strip of photosensitive material.

6. The combination as set forth in claim 5 further comprising a selective light filter positioned between said beam splitter and said photosensitive surface.

7. The combination as set forth in claim 6 wherein said housing contains said light filter and said strip of photosensitive material.

8. The combination as set forth in claim 6 wherein said main support means comprises a spectacle-type arrangement having first and second earpieces and a nosepiece for securement to a wearer's head.

9. The combination as set forth in claim 8 wherein said spectacle-type arrangement carries said housing and said beam splitter in fixed relation, said housing extending parallel with said earpieces above the plane of said earpieces; said aperture facing downward; said beam splitter extending across the line of incidence at an angle thereto, and below said aperture in said housing.